(12) United States Patent
Lussiez et al.

(10) Patent No.: US 8,670,921 B2
(45) Date of Patent: Mar. 11, 2014

(54) ONBOARD ASSISTANCE DEVICE FOR AIDING THE FOLLOWING OF AN AIRPORT ROUTE BY AN AIRCRAFT

(75) Inventors: Eric Lussiez, Merignac (FR); François Michel, Saint Medard en Jalles (FR); Bernard Dubourg, Le Haillan (FR)

(73) Assignee: Thales, Neuilly sur Seine (FR)

( * ) Notice: Subject to any disclaimer, the term of this patent is extended or adjusted under 35 U.S.C. 154(b) by 544 days.

(21) Appl. No.: 13/087,425

(22) Filed: Apr. 15, 2011

(65) Prior Publication Data

US 2011/0257873 A1    Oct. 20, 2011

(30) Foreign Application Priority Data

Apr. 16, 2010  (FR) ...................................... 10 01632

(51) Int. Cl.
*G06F 19/00*   (2011.01)
(52) U.S. Cl.
USPC ..................... 701/120; 701/16; 701/15; 701/3
(58) Field of Classification Search
USPC .................. 701/16, 3, 120, 31.4, 1; 348/169;
244/121, 129.1; 340/961, 951;
382/103; 342/33; 169/43, 51, 53;
102/293; 345/7; 324/72; 434/42
See application file for complete search history.

(56) References Cited

U.S. PATENT DOCUMENTS

| | | | |
|---|---|---|---|
| 6,232,602 B1 | 5/2001 | Kerr | |
| 6,373,055 B1 | 4/2002 | Kerr | |
| 6,679,453 B2 * | 1/2004 | Steiner | ........................... 244/121 |
| 6,806,469 B2 | 10/2004 | Kerr | |
| 6,952,632 B2 * | 10/2005 | Robert et al. | .................... 701/16 |
| 7,102,130 B2 | 9/2006 | Kerr | |
| 7,382,288 B1 | 6/2008 | Wilson | |
| 7,844,392 B2 | 11/2010 | Dubourg | |
| 8,537,222 B2 * | 9/2013 | Weber et al. | ................... 348/169 |
| 2005/0187677 A1 * | 8/2005 | Walker | ............................ 701/16 |
| 2008/0191903 A1 | 8/2008 | Dubourg | |
| 2009/0001871 A1 | 1/2009 | Song | |
| 2010/0039295 A1 | 2/2010 | Dubourg | |
| 2010/0107292 A1 | 5/2010 | Chevallier | |
| 2011/0046868 A1 | 2/2011 | Michel | |

FOREIGN PATENT DOCUMENTS

| | | |
|---|---|---|
| DE | 10 2006 062061 A1 | 7/2008 |
| FR | 2 888 342 A1 | 1/2007 |
| FR | 2 922 072 A1 | 4/2009 |
| WO | 2009/016135 | 2/2009 |

* cited by examiner

*Primary Examiner* — Behrang Badii
(74) *Attorney, Agent, or Firm* — Baker Hostetler LLP (57) ABSTRACT

A device for aiding the following of an airport route by an aircraft includes: an onboard system of optical sensors; means providing the current position of the aircraft; a database having topological information for the airport; a recognition system providing, on the basis of the video images arising from the system of optical sensors, data characteristics of the airport route portion, making it possible to identify a simple primitive representative of the route portion followed; and a processing computer. The processing computer extracts, from the database, a succession of simple geometric shapes representing the airport route and of the same nature as the primitives arising from the recognition system, compares the succession of shapes with the primitives, and validates or invalidates the route followed by the aircraft as a function of the result of the comparison.

5 Claims, 5 Drawing Sheets

| No. | Element | Template | Classification | Possible characteristics |
|---|---|---|---|---|
| 11 | ⊔ | \| | Straight line | Distance to be followed<br>Travel time as a function of the speed |
| 12 | ( | ( | Bend to the right, oblique exit | Angle of exit with respect to entry<br>Radius of curvature of the tangent circle<br>Distance to be followed in the bend |
| 13 | ⌊ | ⌊ | Bend to the left | Angle ( 90°)<br>Distance to be followed in the bend |
| 14 | Y | Y | Crow's foot | Index for exiting on the correct branch-off |
| 15 | ⊔ | \| | Straight line | Distance to be followed<br>Travel time as a function of the speed |
| 16 | ( | ( | Pronounced bend to the right with opening to the left | Angle of entry<br>Angle of exit with respect to entry<br>Radius of curvature of the tangent circle |
| 17 | ⊔ | \| | Straight line | Distance to be followed |

ONBOARD ASSISTANCE DEVICE FOR AIDING THE FOLLOWING OF AN AIRPORT ROUTE BY AN AIRCRAFT

CROSS-REFERENCE TO RELATED APPLICATION

This application claims priority to foreign French patent application No. FR 10 01632, filed on Apr. 16, 2010, the disclosure of which is incorporated by reference in its entirety.

FIELD OF THE INVENTION

The field of the invention is that of electronic or optoelectronic devices for aiding ground guidance for aircraft travelling around an airport route. It should be noted that, in what follows, the terms aeroplane, carrier and craft will be used without distinction to designate an aircraft.

BACKGROUND OF THE INVENTION

Airports currently represent a bottleneck for ever heavier air traffic. The rise in their capacity brings about ever greater complexity of the network of runways, taxiways and boarding zones. Incidents where the aircraft follows paths that are not in accordance with the itinerary dispatched by ground control via the radio are therefore being witnessed ever more often. Of course, the possibilities of incidents increase in poor weather or in poor visibility conditions. It is therefore fundamental that the pilot of the aircraft knows very precisely where his aircraft is situated in the airport zone and that he is perfectly aware of the route that he will have to follow and the manoeuvres that he will have to perform.

From the pilot's point of view, the position of the aircraft in an airport zone is currently obtained by consulting the outside indications on or in the vicinity of the taxiing zones. This perception of the positioning is correlated with the indications of a view of "moving-map" type which displays the aircraft on a horizontal plan of the airport zone (view from above or "bird's eye" view). This display system uses location of the carrier by the position data charted by systems of "GPS" (Global Positioning System) type and/or the inertial platform of the craft. The error margins engendered by systems based on GPS systems are too large to direct the aircraft when taxiing in poor meteorological conditions due for example to dense fog or to heavy rain, which greatly reduce visibility.

To improve the perception of the environment, notably in conditions of poor visibility, use is made of systems of "EVS" (Enhanced Vision System) type based on presentations of video images taken by onboard cameras. These "EVS" systems which constitute a worthwhile visual aid present the drawback of not correlating the images provided with airport databases.

To improve the effectiveness of "EVS" presentations, systems have been developed comprising at one and the same time optical sensors and means for comparing the images arising from these sensors with information arising from airport databases. These systems are termed "ESVS", standing for Enhanced Synthetic Vision System or "CVS" for Combined Vision System. One of the main objectives of these systems is the detection of runway lamps and then the recognition of shapes or patterns known by the term "pattern recognition" on the basis of geometric points or primitives arising from this detection. To ensure this detection in all weathers, the cameras of these systems can operate in various wavelength ranges from the visible to the near infrared so as to better differentiate the images of the runway lamps from the background image. The images arising from the optical sensors can also be combined in various ways or be mixed with synthesized information coming from the database. Matching with the information contained in the database makes it possible to enrich the images resulting from the optical system and to consolidate the position of the aircraft on the basis of the position in the image of the objects detected on the runway. Information about systems of this type will be found in U.S. Pat. Nos. 6,232,602, 6,373,055, 6,806,469 and 7,102,130.

U.S. Pat. No. 7,382,288 from the company Rockwell and Collins describes an onboard device presenting a view of the outside landscape on a Head-Up sight or "HUD", standing for Head-Up Display, with a representation of the airport indicator panels, this device is based on a system comprising neither cameras nor correlation with a database BDD. Orientation on the airport is aided by displaying panels in the HUD. This device presents the major drawback of basing the representation on location information of "GPS" type that is not consolidated by outside vision, the precision not being sufficient to guide the aeroplane perfectly in all circumstances.

These systems make it possible to substantially improve the perception of the outside environment. However, the image proposed by these systems does not facilitate perception and validation of the trajectory to be followed by the pilot. Indeed, under conditions of reduced visibility, with the EVS view not containing the indication of the trajectory to be followed, the system presents the drawback for the pilot of having to correlate the trajectory represented for example on a view of "moving map" type with his EVS view optionally enriched. This results in an overload of work. The pilot must extract indices characteristic of the route to be followed so as to be able to verify that the patterns recognized by the recognition system do indeed correspond to the desired route. Thus, these systems do not make it possible either to automatically confirm that the aeroplane is indeed following a route or to generate alerts in case of deviation with respect to this route.

SUMMARY OF THE INVENTION

The onboard assistance device for aiding the following of an airport route by an aircraft according to the invention does not present these drawbacks. In regard to the operational procedures, the device according to the invention makes it possible to pilot the aeroplane, notably in the case of greatly reduced visibility, so as to perform a journey on the airport taxiways. The validation of the route is done by the recognition of shapes or primitives detected in the video image arising from the runways and runway verges and the comparison of the said primitives with the information arising from the databases. By way of examples, it is possible to detect runway lamps, to discriminate runway/runway verge limits or ground markings. The invention also relates to a presentation of images of "EVS" type enriched with information extracted from the database and suited to the course around the airport route.

Embodiments of the invention include an onboard assistance device for aiding the following of an airport route by an aircraft, the device including: a system of optical sensors which provides video images of the airport route; means providing the current position of the aircraft; and a database having topological information for the airport on the airport route to be followed by the aircraft.

The device further includes: a recognition system which provides, on the basis of the video images, data characteristics of the portion of the airport route seen by the system of optical sensors; a processing computer which: extracts from the database, a succession of simple geometric shapes representing the airport route; constructs "primitives" on the basis of the information received from the recognition system, a "primitive" having at least one simple geometric pattern representative of the route portion; comparing the "primitives" with the simple geometric shapes representing the airport route and extracted from the database; and validating or invalidating the route followed by the aircraft as a function of the result of the comparison.

Another embodiment includes a viewing system having a viewing screen, the screen for displaying a conformal view of the airport route situated in front of the aircraft. The screen also displays a succession of graphical symbols, each graphical symbol being associated with a geometric shape extracted from the database.

The central graphical symbol corresponds to the portion of the airport route immediately succeeding the route portion on which the aircraft is situated. In a variant, the central graphical symbol is displayed on the screen at the same height as the airport route portion represented as a conformal view and with which it is associated. The symbols comprise alphanumeric information.

The device displays an alert message on the viewing screen or emits an audible alarm when the processing computer invalidates the route followed by the aircraft.

BRIEF DESCRIPTION OF THE DRAWINGS

The above and other aspects, features, and advantages of the present invention will be more readily understood by reading the following nonlimiting detailed description and in view of the accompanying figures, in which.

DETAILED DESCRIPTION

Figure 1:
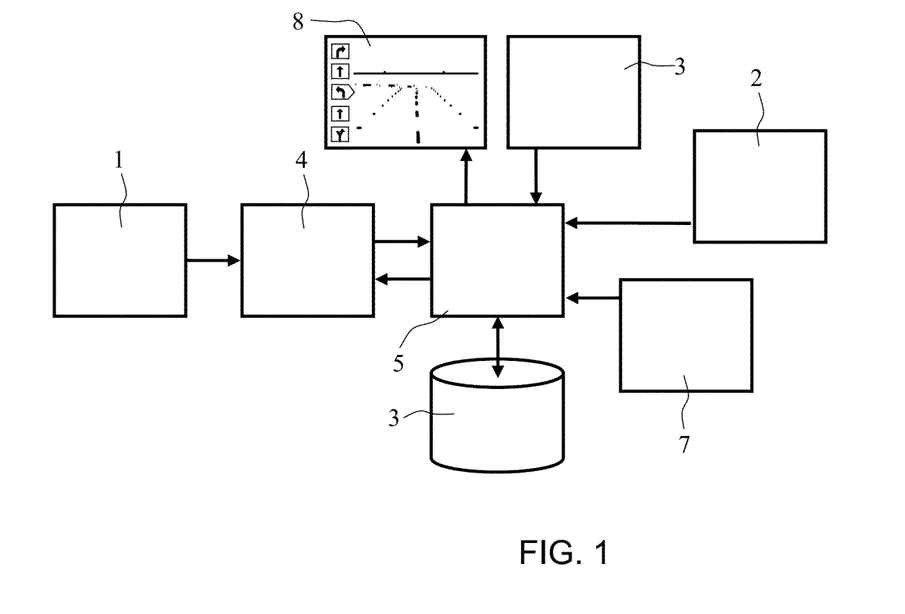
FIG. 1 represents a schematic of the onboard assistance device according to the invention.

The device according to one or more embodiments of the presented invention is represented in FIG. 1. The device includes at least:
  a system of optical sensors 1 which provides video images of the airport route;
  means 2 for providing the current position of the aircraft;
  a database 3 having the topological information for the airport on the airport route to be followed by the aircraft;
  a recognition system 4 which provides, on the basis of the video images, a "primitive" of the portion of the airport route seen by the system of optical sensors, a "primitive" being at least one simple geometric pattern representative of the route portion;
  a processing computer or processor 5 linked to the means 2 for providing the current position of the said aircraft, to the database 3, to the recognition system 4, to the systems of the aircraft 6, to storage means 7 intended to store the useful information extracted from the database.

The computer is configured to:
  extract from the database, a succession of simple geometric shapes representing the airport route and of the same nature as the "primitives" arising from the recognition system;
  compare them with the said "primitives," in which the outcome of this correlation is the deduction of information utilizable by the pilot or the other aeroplane systems so as to follow the route which was assigned to the aeroplane in the ground taxiing phases; and
  validate or to invalidate the route followed by the said aircraft as a function of the result of the comparison.

A viewing system 8 includes at least one viewing screen, the screen displaying a conformal view or a view from above of the airport route and a succession of graphical symbols, each graphical symbol being associated with a geometric shape extracted from the database.

The sensors 1 are a system of one or more cameras that are able to detect light waves in the infrared or visible region. They are generally arranged at the front of the craft.

The means 2 providing the current position of the said aircraft in the airport zone is provided, for example, by an "AGARS" system, e.g., an Aircraft Communication Addressing and Reporting System, which is a system of communications which are coded according to an "ARINC" aeronautical standard between an aircraft and a ground station. The route and the associated authorizations also called "clearance" are communicated to the crew, either via the radio by the "ATC", standing for Aircraft Traffic Control, or through digital links of "CPDLC" type, standing for Controller Pilot Data Link Communications. The crew advises the aeroplane systems so as to take into account this route which could be displayed on a viewing device in the form of an airport "moving map".

The database 3, the format of which is generally standardized, for example by the standard RTCA DO-272/EUROCAE ED-99, contains geometric primitives for ground description of the polygon, line or point type which make it possible to describe the horizontal extent of the airport's objects: buildings, runways, access routes to the parking areas for the aircraft or "taxiways", layout of the parking areas or "aprons", ground markings or "guidance lines", etc. A primitive is defined by a "template" or simple geometric pattern (straight segment, circular arc, elementary shapes such as T, V or Y, etc.) with which taxiing characteristics such as the distance to be followed, the authorized taxiing speed, etc. are associated.

Initially, the computer 5, as a function of a route to be followed while taxiing on the runways of the airport and of the position of the aeroplane, extracts from the database the information to be recognized and structures it in such a way as to use it during taxiing. The stages for the creation of the information in the memory 7 therefore include:
  computation of the series of identifiable or primitive elements on the basis of the route and criteria usable by the recognition system. These criteria are based on patterns or templates which are easily recognizable in the images arising from the system of sensors; and
  organization of the data structure containing the aforementioned series. The organization may be based in the order of traversal of the series of elements to be recognized while journeying along the route.

Subsequently, the computer 5 uses this data structure so as to verify the following of the trajectory and to give additional information relating to this following. The scheme consists, on the basis of the location of the carrier and of its route, in extracting a series of primitives on the basis of the elements of the database along the journey having the characteristic of being identifiable either directly or by interpolation by the vision system 1. For example, the primitive may be a segment at the runway centre extracted from the polygons and descriptive of a taxiway. The interpolation consists in deducing from the objects identified by the recognition function such as the runway centre lamps for example, information making it possible to identify a primitive such as segments in the centre of the runway making it possible to "classify" the viewed part. The identification is done by comparing geometric characteristics of the recognized shape such as, for example, the position and the radius of curvature of a curve, with the geometric characteristics of the primitive to be recognized in the list of previously constructed primitives.

These objects constitute a series of connected elements marked as such in the data structure created in the memory 7. In the case where the processor 5 provides the recognition system 4 with the primitives to be recognized, then the output from the recognition system 4 to the processor 5 contains solely the confirmation or the absence of confirmation of the primitive to be recognized.

By making this data structure available during taxiing, it is made possible, in view of the location information, to validate the stages constituted by the recognitions of the expected patterns and thus to consolidate the following of the route.

The computer can, during the validation of the stages, store the next stage to be validated and moreover give information about this next stage. The computer can also facilitate the work of the recognition system by providing it with a transformed image of the shape or of its template in the camera's viewing reference frame by virtue of the knowledge of the characteristics of the cameras such as the height of the camera relative to the ground, its angle of view, the direction of view, etc.

Figure 2:
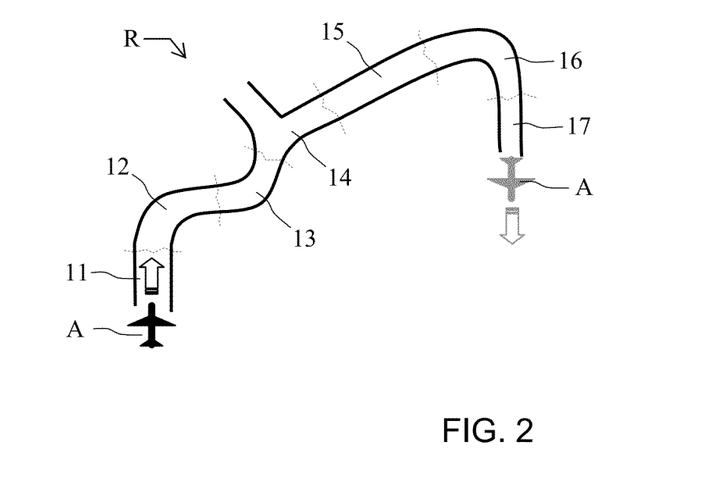
FIG. 2 represents a view from above of an aircraft following an airport route.
Figure 3:
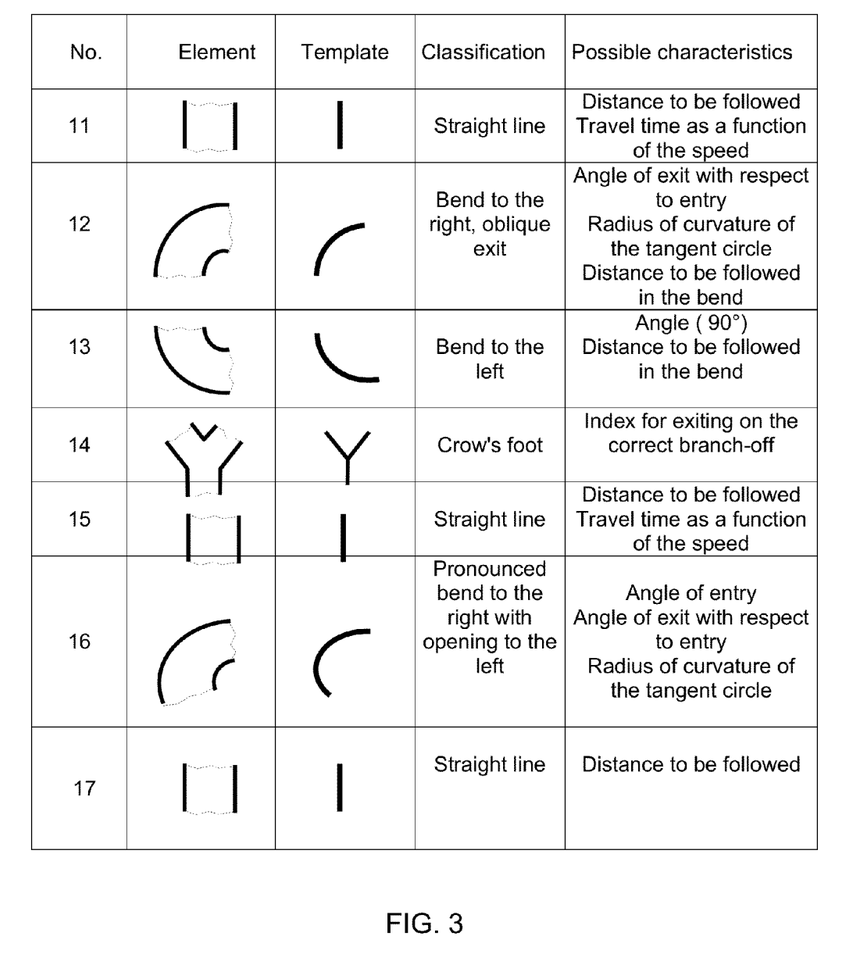
FIG. 3 represents the table for classifying the primitives making up the said airport route.

FIGS. 2 and 3 illustrate the operation of the assistance device for aiding the following of an airport route according to the invention. In FIG. 2 is represented the view from above of an airport route R to be followed by an aircraft A. In this figure and in FIG. 11, the current position of the aircraft A is represented in black, its future position in grey. This route R is sectioned into seven elements numbered from 11 to 17. As indicated in the table of FIG. 3, the computer will determine the primitive or the template corresponding to each element. For example, the element 11 corresponds to a straight line section. Characteristics and directives required for the taxiing of the aircraft will thereafter be allocated to each primitive by the computer, as a function of the various data. Thus, as seen in the first row of the table of FIG. 3, two characteristics are associated with the straight line 11, the first relating to the distance to be followed, the second the predictable travel time, dependent on the authorized speed. Finally, the computer will compare the succession of its "primitives" extracted from the database with those actually provided by the recognition system. Thus, in the example hereinabove, the system will have successively to recognize the straight line 11, the bend to the right 12, the bend to the left 13, the "crow's foot" 14, etc.

During the taxiing phase, the crew has a significant workload. On the one hand, one of the two crew members denoted "$P_F$" for Pilot Flying is in charge of piloting and the other member, denoted "PNF" for Pilot Non Flying is more particularly in charge of communications with the ATC or Air Traffic Control. The two crew members need to consult the map in order to carry out the assigned tasks, while as far as possible looking outside so as to obtain the maximum outside information and to ensure that the route is followed in complete safety. These tasks are particularly burdensome to shoulder when the crew is reduced to the pilot alone.

A example symbology representative of the key stages of the route to be followed is presented to the pilot by the viewing device 8. This symbology, representative of the validation by the system of the following of the stages during the aeroplane's journey, makes it possible to inform the pilot of the decisions to be taken during the stages, and to alert him when the aeroplane trajectory is no longer compatible with the route to be followed. Various viewing devices exist in a modern aircraft cockpit. Preferably, the information is displayed in a Head-Up sight or "HUD" for Head-Up Display. This type of device makes it possible to overlay on the view of the outside a video view of "EVS" (Enhanced Vision System) type comprising a symbolic description representative of the journey or of the route to be followed. Generally, the EVS view is enriched with a synthetic symbology as a conformal view, the description of the route to be followed being represented as a non-conformal view. The expression conformal view is understood to imply a view overlaid exactly on the real outside view of the route. The route to be followed is represented by a succession of patterns arising from the computer and representing the various "primitives" constituting the route. They can comprise characteristics and/or steering indications.

The representation can distinguish the already recognized stages, the current stage or the one shortly to be reached and the future stages. The system can then display a view which presents the symbols in the form of a dropdown menu, with a distinction between the current situation and the forthcoming next stage. The symbols can comprise characteristics related to these stages. The characteristic may be an indication of the distance to the point of entry to the zone of the primitive such as entry to a bend, a point of alignment on a straight line, etc.

Figure 4:
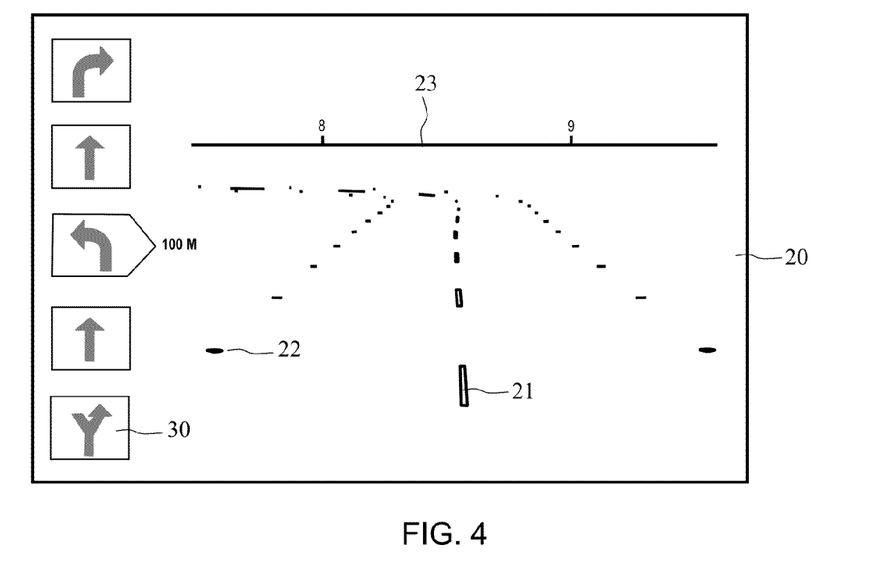
FIGS. 4 and 5 represent two views of "EVS" type according to the invention.
Figure 5:
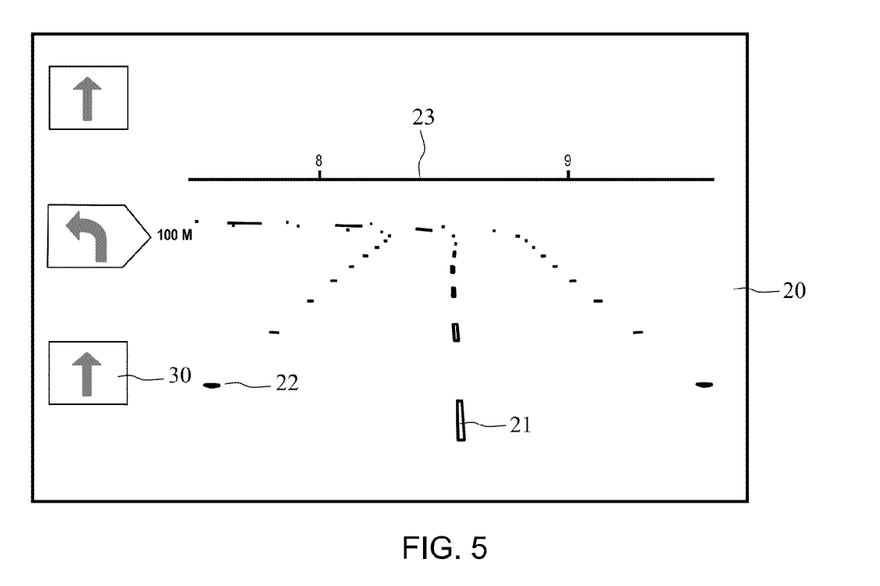

By way of example, FIGS. 4 and 5 represent two views 20 of "EVS" type which may be presented in a Head-Up sight. These two views essentially comprise a representation of the runway as a conformal view and symbols 30 according to the invention.

The lamps 22 which border the runway and the central bands 21 can be made out in these perspective views of the runway. As seen, the runway is first straight and then turns to the left. The horizon is also represented in the form of a straight line 23.

The symbols 30 are representative of the route to be followed. In FIGS. 4 and 5, they are aligned vertically and successively to the left of the conformal views. Of course, other arrangements are possible.

There are various possible logical ways of representing these symbols. As a first example represented in FIG. 4, the central graphical symbol corresponds to the portion of the airport route immediately succeeding the route portion on which the aircraft is situated so that the pilot can anticipate the next action that he will have to perform. To distinguish it from the others, this symbol comprises a pentagonal surround different to the rectangular surround of the other symbols represented. An option may be offered to the pilot by the activation of a particular mode of traversal of the stages of the trajectory, allowing him to scroll the various symbols representing the route to be followed via an interaction medium of "mouse wheel" type.

As a second example, represented in FIG. 5, the central graphical symbol is displayed on the screen at the same height as the airport route portion represented as a conformal view with which it is associated. Likewise, the current stage, which in this case is the run along a straight line, is represented opposite its zone in the perspective of the image. Here again, to distinguish it from the others, this symbol comprises a pentagonal surround different to the rectangular surround of the other symbols represented. It is also possible to represent the future stages which are absent from the perspective above the horizon 23.

Figure 6:
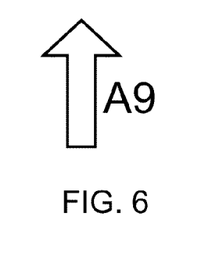
FIGS. 6 through 10 represent various types of symbols according to the invention.
Figure 7:
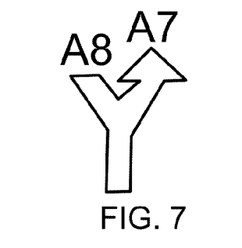
Figure 8:
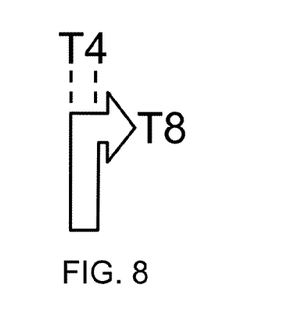

In FIGS. 4 and 5, the symbols are blank thick grey arrows whose shape corresponds to the primitive to be represented. It is also possible to tailor the graphical representation and/or add simple labels to these primary graphical symbols. FIGS. 6 to 10 illustrate these possibilities. In FIGS. 6 and 7, the labels are representative of the names of the taxiways or of current runways "A7", "A8" and "A9" or entail a topographic relation representative of the topology of the taxiways represented.

Figure 9:
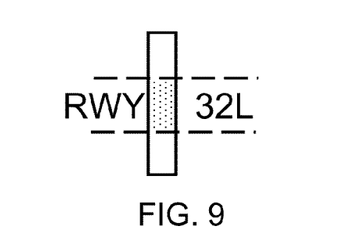
Figure 10:
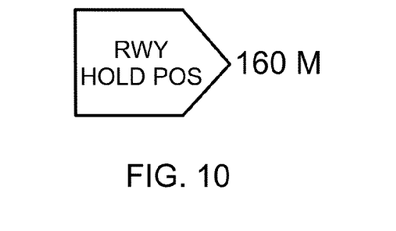

The representation of the symbols may be enriched so that the appearance of the whole or of a part of the symbol carries a meaning. For example, in FIG. 8, the dashes indicate that the pathway T4 is presented by way of indication and should not be followed. In FIG. 9, the runway "RWY 32" has a specific aspect different from that of the current runway. The symbols can correspond to a signalling element. This representation proves to be particularly relevant when, as represented in FIG. 5, the central graphical symbol is displayed on the screen at the same height as the airport route portion represented as a conformal view and with which it is associated. For example, the label "RWY HOLD POS" coupled with the indication "160 M" indicates to the pilot that he must comply with a runway threshold stop at 160 meters, also called "RunWaY HOLDing POSition".

By placing in parallel the theoretical trajectory of the aeroplane, that is to say what the system ought to have recognized if it had followed the correct route with the real trajectory, that is to say what the recognition system has actually identified, it is possible to detect the routing errors on the runways.

In the same manner, by monitoring the values of the piloting controls or else those for the attitude of the aeroplane and by comparing them with the patterns and with their position detected in the images arising from the sensors, it is possible:
  to indicate to the pilot the directives in relation to the patterns, either visually for example on the "EVS" view, or audibly;
  to determine at the earliest the orientation errors due to non-compliance with the directives; and
  to indicate a tendency of following of the trajectory. The indication of this tendency is essential when the pilot deviates from the correct trajectory. This indication may be represented by a specific symbology or the display of textual messages such as "Wrong Taxiway" or "Missed Taxiway". It is also possible to generate audio alarms or directives.

Moreover, the knowledge of the characteristics of the carrier allows the system to evaluate the impossibility of regaining the nominal route on the basis of the characteristics of the patterns.

This advantage of the system is made possible by the precision of the shape recognition which is much greater than the precision of location by systems of "GPS" type and by the implementation of criteria associated with the pattern. A criterion is a comparison of measured values, compared with the characteristics of the pattern.

Figure 11:
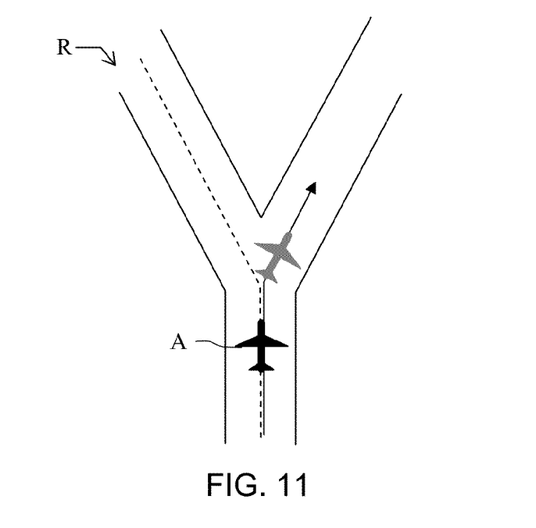
FIGS. 11 through 13 represent the detection of a routing error by the device according to the invention.
Figure 12:
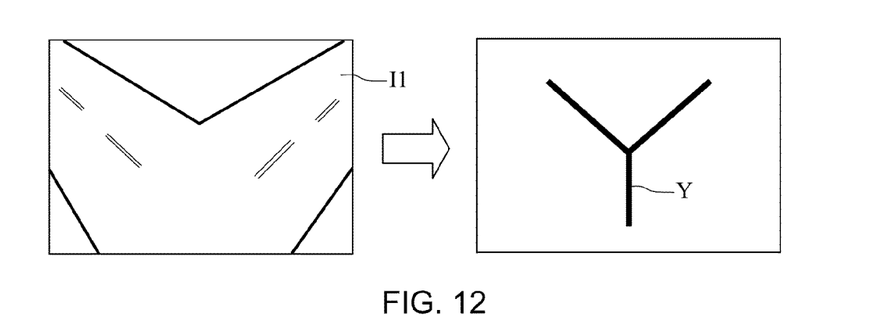
Figure 13:
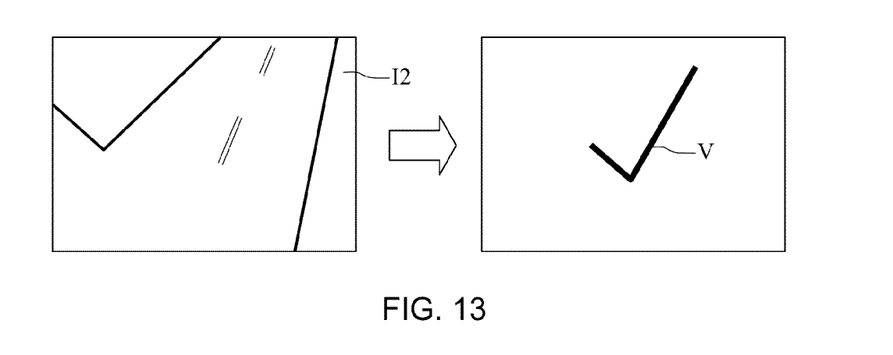

FIGS. 11, 12 and 13 illustrate these possibilities of detecting trajectory errors. In these figures, the craft A is facing a "Y"-shaped "crow's foot". It has taken or will take the wrong branch-off and risks finding itself in the right-hand branch of the "Y" whereas it ought to have entered the left branch. Before the branch-off, the sensors record the image 11 depicted on the left of FIG. 12 and the recognition system, on the basis of this image detects the Y-shaped "crow's foot" represented in the right-hand view of FIG. 12. After a certain duration following the validation of the "Y"-shaped pattern, the sensors record the image 12 represented on the left of FIG. 13, the recognition system detects a pattern such as represented in the right-hand view of this FIG. 13. This pattern is a "V" whose left branch is shorter than its right branch. Now, if the aeroplane had followed the correct runway, it is the left branch of the "V" which ought to have been the longer. In this case, the system proposes an indication to alert of the wrong direction, and/or to indicate the correct one. One of the decisional criteria may be to evaluate the distance between the tip of the branch-off and the carrier. If this distance is too small, the system signals the impossibility of following the correct route to the pilot, so that he establishes a new route in collaboration with the ATC.

The trajectory parts recognized by the recognition system may be represented graphically on a view of "moving map" type which may be a view from above. A different colour or else an overscore which resembles a progress bar may be used. In the same manner, the cone of vision or "wedge" which makes it possible to represent the lateral angular sector seen by the vision system may be represented on this view from above of "moving map" type. In the same manner, the cone of vision which makes it possible to represent the vertical angular sector seen by the vision system, associated with a profile view of the aeroplane, may be represented on a lateral view.

What is claimed is:

1. An onboard assistance device for aiding the following of an airport route by an aircraft, said device comprising:
  a system of optical sensors which provides video images of said airport route;
  means providing the current position of the said aircraft;
  a database comprising the topological information for the airport on the airport route to be followed by the aircraft;
  a recognition system which provides, on the basis of the video images, data characteristic of the portion of the airport route seen by the system of optical sensors;
  a processing computer configured to:
    extract from the database, a succession of simple geometric shapes representing the stages of the airport route;
    construct primitives on the basis of the information received from the recognition system, a primitive comprising at least one simple geometric pattern representative of the route portion;
    compare said primitives with the simple geometric shapes representing the stages of the airport route extracted from the database;
    validate or invalidate the route followed by said aircraft as a function of the result of the comparison; and
  a viewing system comprising a viewing screen, said screen displaying a conformal view of the airport route situated in front of the aircraft and a succession of graphical symbols, each graphical symbol being associated with a geometric shape extracted from the database, the succession of symbols representing the stages of the airport route that are already recognized, the current stage, and the future stages.

2. The onboard assistance device for aiding the following of an airport route by an aircraft according to claim 1, wherein a central graphical symbol of the graphical symbols corresponds to the portion of the airport route immediately succeeding the route portion on which the aircraft is situated.

3. The onboard assistance device for aiding the following of an airport route by an aircraft according to claim 1, wherein a central graphical symbol of the graphical symbols is displayed on the screen at a same height as the airport route portion represented as a conformal view and with which it is associated.

4. The onboard assistance device for aiding the following of an airport route by an aircraft according to claim 1, wherein the graphical symbols comprise alphanumeric information.

5. The onboard assistance device for aiding the following of an airport route by an aircraft according to claim 1, wherein the device one of displays an alert message on the viewing screen and emits an audible alarm when the processing computer invalidates the route followed by the aircraft.

* * * * *